No. 693,598. Patented Feb. 18, 1902.
H. GLACKEN.
EGG PRESERVING APPARATUS.
(Application filed July 20, 1901.)
(No Model.)
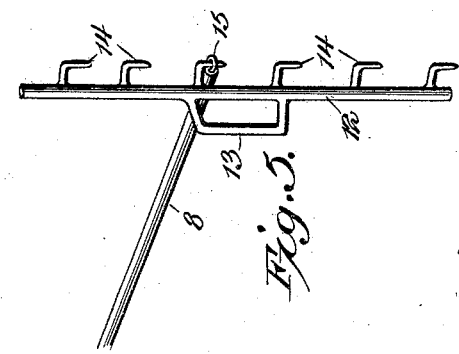
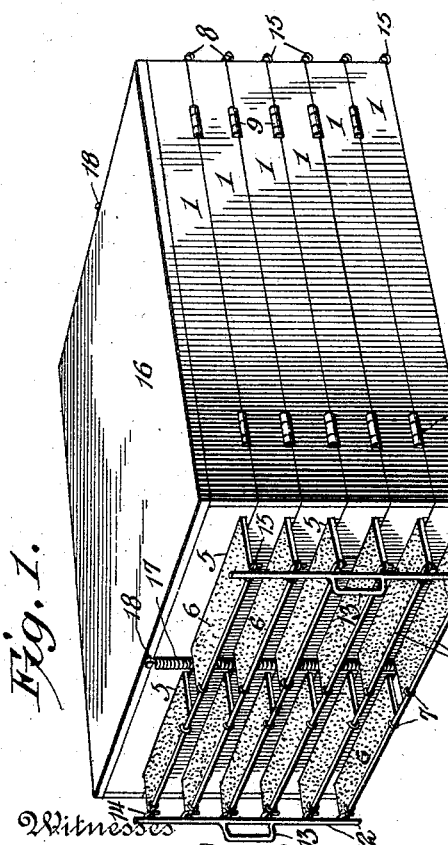
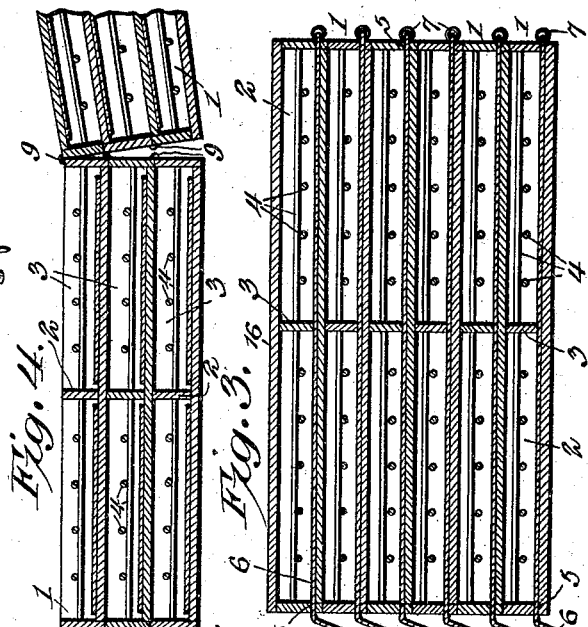
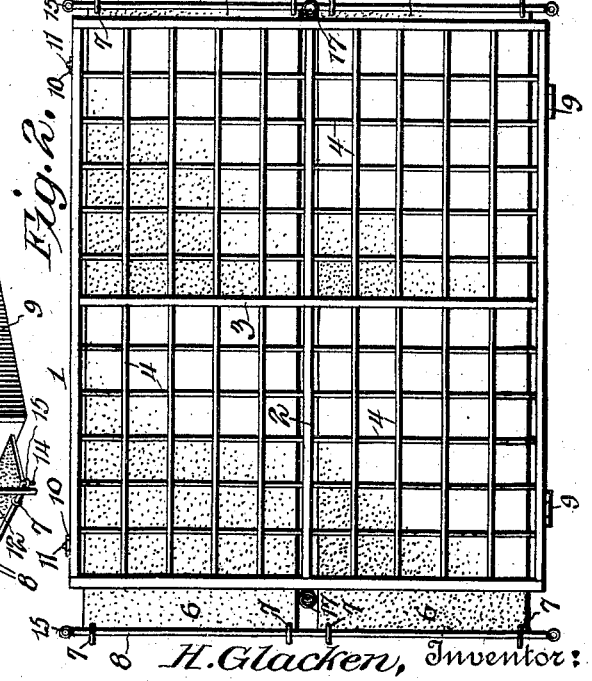
H. Glacken, Inventor
Attorney

UNITED STATES PATENT OFFICE.

HUGH GLACKEN, OF CONROE, TEXAS.

EGG-PRESERVING APPARATUS.

SPECIFICATION forming part of Letters Patent No. 693,598, dated February 18, 1902

Application filed July 20 1901. Serial No. 69,129. (No model.)

*To all whom it may concern:*

Be it known that I, HUGH GLACKEN, a citizen of the United States, residing at Conroe, in the county of Montgomery and State of Texas, have invented a new and useful Egg-Container, of which the following is a specification.

This invention relates to the art of packing, storing, and preserving eggs, and has for its object to provide for the convenient packing of a plurality of eggs in a single container and for maintaining the eggs separated in sections or layers to protect the same against breakage and to facilitate the packing and removal of the eggs. It is furthermore designed to arrange for conveniently turning the eggs, so as to obviate spoiling thereof by reason of the eggs remaining too long in one position, and to provide for simultaneously turning all of the eggs in the several sections by means of a single operation.

Another object resides in the provision of an improved egg-turning device which is constructed to facilitate the sliding movement thereof and to insure an effective engagement with the eggs to secure a prompt turning thereof and to guard against slipping of the eggs upon the turning device.

A final object of the invention contemplates the provision of means for simultaneously operating the turning devices of the several sections and also the interchange of such means from end to end of the container, so as to arrange for the convenient operation of the turning devices from either end of the container.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view illustrating a plurality of containers embodying the present invention and assembled to form a divisional egg-crate. Fig. 2 is a top plan view thereof with the cover removed. Fig. 3 is a longitudinal sectional view. Fig. 4 is a cross-sectional view with several of the upper sections swung over to expose one of the intermediate sections. Fig. 5 is a detail perspective view of one of the handles for operating the egg-turning device.

Like characters of reference designate corresponding parts in all the figures of the drawings.

In carrying out the present invention there is provided a shallow substantially rectangular box-like body 1, which is closed at the bottom and open at the top and is provided with a longitudinal partition 2 and a transverse partition 3, which are disposed to divide the box into four equal sections. A plurality of other longitudinal and transverse partitions are provided throughout the several sections of the body and formed by wire rods 4, which have their opposite ends connected to the respective sides of the body and are located about one-half of an inch above the bottom of the body, thereby dividing the several body-sections into a plurality of substantially shallow cells for containing the eggs. In the opposite ends of the body and at opposite sides of the longitudinal partition there are provided the corresponding slots 5, which are flush with the bottom of the body and extend for nearly the entire width of the half-section thereof. These corresponding openings are designed for the reception of the opposite ends of an egg-turning device, one of which is located at either side of the longitudinal partition, and it consists of a strip of oil-cloth 6, with its oiled surface next to the bottom of the body, so that it may slide easily thereon, while its opposite upper surface is treated to a coat of mucilage or other adhesive material, to which is applied a surface of finely-sifted sand, thereby to provide a comparatively rough frictional surface, so as to insure an effective engagement with the eggs. Each end of this flexible turning-strip is projected through the adjacent slot in the end of the body, and it is provided at each corner with a ring 7, there being a transverse rod 8 passed through the rings of the corresponding ends of the opposite turning-strips, whereby said strips may be simultaneously operated by pulling upon the rod.

It is designed to associate a plurality of these containers so as to form a sectional crate by placing the containers one upon the other and connecting the corresponding edges of adjacent containers by means of hinges 9, so that the several containers are foldably connected in the manner of the leaves of a book. The opposite free edges of adjacent containers are normally connected by means of suitable detachable fastenings—as, for instance, hooks and eyes 10 and 11, respectively. By this arrangement access may be had to any individual container by throwing over the upper sections upon their hinges in the manner shown in Fig. 3 of the drawings.

To provide for simultaneously operating the several egg-turning devices, there is provided a pair of operating devices, each consisting of a rod 12, having an intermediate loop-shaped handle 13 and a plurality of laterally-projected hooks 14, located upon the opposite side of the rod and designed for engagement with the eyes 15, carried by the corresponding ends of the horizontal connecting-rods of opposite turning-strips. It will be understood that an operating device of this character is applied to each side of the several egg-turning strips, so that all of the latter may be simultaneously drawn outwardly by proper manipulation of the two operating devices. After the turning-strips have been drawn outwardly in one direction they may be drawn outwardly in the opposite direction by removing the operating devices and applying the same to the said opposite ends of the strips, whereby the turning-strips may be conveniently moved in opposite directions, so as to turn and re-turn the eggs whenever desired.

When a plurality of containers are assembled to form a crate, it is designed to have the uppermost section protected by means of a flat cover or top 16, which is detachably held in place by means of the offset helical springs 17, which lie at opposite ends of the crate and have their opposite ends provided with terminal hooks 18, that engage with the bottom of the crate and the top or cover 16 for the purpose of detachably holding said top in place.

Although I have shown a plurality of containers assembled to form a crate, it will be understood that each container is complete in itself, and therefore may be used independently of other containers—as, for instance, for supporting eggs within an incubator or for any other desired purpose. It will be observed that the transverse rods 6 form a stop for engagement with the ends of the containers, so as to limit the endwise movement of the egg-turning strips.

What I claim is—

1. An egg-turning device, having an endwise-slidable and flexible turning-strip formed of oil-cloth, the oiled surface of which is constructed to form a bearing-surface, and its opposite face being provided with a coating of adhesive material, and a surface layer of sand.

2. An egg-turning device having an endwise-slidable and flexible turning-strip formed of oil-cloth, the oiled surface of which is constructed to form a bearing-surface and its opposite face being provided with a coating to form a frictional egg-engaging surface.

3. In a device of the character described, the combination with a plurality of endwise-movable egg-turning strips, of rods connecting the corresponding ends of adjacent strips, and an operating device having an intermediate handle and laterally-projected hooks for detachable engagement with the respective rods of the egg-turning strips.

4. In a device of the character described, the combination of a plurality of superposed egg-containers, endwise-movable egg-turning strips within the respective containers and projected outwardly in opposite directions through the opposite ends thereof, eyes provided upon the opposite ends of the strips, rods passed through the corresponding eyes of adjacent strips and provided with opposite terminal eyes, and an operating device consisting of opposite upright rods having intermediate handles and laterally-projected hooks constructed for detachable engagement with the terminal eyes of the respective transverse rods.

5. A device of the character described, having endwise-movable egg-turning strips which are disposed side by side and in substantially horizontal alinement, terminal eyes provided upon opposite ends of the strips, and rods passed through the eyes of adjacent strips at corresponding ends thereof, whereby said strips are connected for simultaneous movement.

6. A device of the character described comprising a plurality of superposed sections, each of which has a closed bottom and an open top, a cover for the uppermost section, and opposite helical springs having terminal hooks for engagement with the cover and the body of the lowermost section.

In testimony that I claim the foregoing as my own I have hereto affixed my signature in the presence of two witnesses.

HUGH GLACKEN.

Witnesses:
W. M. POOLE,
PETER WEST.